United States Patent
Li et al.

(10) Patent No.: US 12,238,417 B2
(45) Date of Patent: Feb. 25, 2025

(54) PHOTOGRAPHING DEVICE, CONTROL METHOD THEREOF, AND MOVABLE PLATFORM

(71) Applicant: SZ DJI TECHNOLOGY CO., LTD., Shenzhen (CN)

(72) Inventors: Bing Li, Shenzhen (CN); Jun Ma, Shenzhen (CN); Fangpei Yang, Shenzhen (CN); Wen Zou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 155 days.

(21) Appl. No.: 17/715,042

(22) Filed: Apr. 7, 2022

(65) Prior Publication Data
US 2022/0232164 A1 Jul. 21, 2022

Related U.S. Application Data (63) Continuation of application No. PCT/CN2019/110453, filed on Oct. 10, 2019.

(51) Int. Cl.
*H04N 23/68* (2023.01)
*H04N 23/63* (2023.01)

(52) U.S. Cl.
CPC ......... *H04N 23/683* (2023.01); *H04N 23/632* (2023.01)

(58) Field of Classification Search
CPC ........................... H04N 23/683; H04N 23/632
See application file for complete search history.

(56) References Cited

U.S. PATENT DOCUMENTS

| | | | |
|---|---|---|---|
| 10,742,887 B1* | 8/2020 | Gigot | H04N 23/6812 |
| 2006/0198447 A1* | 9/2006 | Chen | H04N 21/4341 |
| | | | 375/240.26 |
| 2007/0070069 A1* | 3/2007 | Samarasekera | G06F 3/011 |
| | | | 707/E17.013 |
| 2007/0212043 A1 | 9/2007 | Izawa | |
| 2009/0067829 A1 | 3/2009 | Li et al. | |
| 2014/0211032 A1* | 7/2014 | Owen | H04N 23/683 |
| | | | 348/208.99 |

(Continued)

FOREIGN PATENT DOCUMENTS

| CN | 202334754 U | 7/2012 |
|---|---|---|
| CN | 103808723 A | 5/2014 |
| CN | 204258983 U | 4/2015 |

(Continued)

OTHER PUBLICATIONS

International Search Report and Written Opinion mailed on Jun. 22, 2020, received for PCT Application PCT/CN2019/110453, Filed on Oct. 10, 2019, 10 pages including English Translation.

*Primary Examiner* — Clayton R Williams
(74) *Attorney, Agent, or Firm* — ANOVA LAW GROUP, PLLC (57) ABSTRACT

A photographing device, its control method, and a movable platform can include: acquiring a real-time video frame; duplicating the real-time video frame to obtain two real-time video frames; outputting one of the two real-time video frames for display and perform a stability augmentation processing on the other of the two real-time video frames; and saving the stability augmentation processed real-time video frame.

19 Claims, 5 Drawing Sheets

(56) References Cited

U.S. PATENT DOCUMENTS

2018/0359415 A1* 12/2018 Liang .................. H04N 23/683

FOREIGN PATENT DOCUMENTS

| | | |
|---|---|---|
| CN | 204297111 U | 4/2015 |
| CN | 104754180 A | 7/2015 |
| CN | 106257911 A | 12/2016 |
| CN | 108007439 A | 5/2018 |
| CN | 109743495 A | 5/2019 |
| CN | 109792484 A | 5/2019 |
| CN | 110235431 A | 9/2019 |
| JP | 2005-277644 A | 10/2005 |
| JP | 2019-103132 A | 6/2019 |

* cited by examiner

PHOTOGRAPHING DEVICE, CONTROL METHOD THEREOF, AND MOVABLE PLATFORM

CROSS-REFERENCE TO RELATED APPLICATION

The present application is a continuation of International Application No. PCT/CN2019/110453, filed Oct. 10, 2019, the entire contents of which being incorporated herein by reference in its entirety.

FIELD

The present disclosure relates to image acquisition, and particularly relates to a photographing device, a control method thereof, and a movable platform.

BACKGROUND

With the upgrading of consumption, more and more people pay attention to sports and health in their lives in recent years. Many young people like to use sports cameras to record the wonderful moments of their outdoor activities. In addition, with the endless emergence of products such as sports cameras, it has gradually become popular to use them to record one's daily lifestyle, and it has been permeated all aspects of our lives. However, shooting in the course of sports may face the effect of poor image display due to the shaking of the photographing device, and for small sports cameras, the use of pan-tilt structure for stabilization may limit the structural design of the sports camera. Besides the need for stabilization, users also expect to be able to obtain timely feedback of image information, that is, to be able to display image information in real time (i.e., live view). Therefore, there is a need for improving the image processing process of motion cameras, such as sports cameras.

SUMMARY

The present disclosure provides a photographing device, a control method thereof, and a movable platform.

According to a first aspect of the present disclosure, a control method for a photographing device is provided, the control method can comprise:
acquiring a real-time video frame;
duplicating the real-time video frame to obtain two real-time video frames;
outputting one of the two real-time video frames for display, and performing a first stability augmentation processing on the other of the two real-time video frames; and
saving the first stability augmentation processed real-time video frame.

According to a second aspect of the present disclosure, a photographing device is provided. The photographing device can comprise:
circuitry configured to
acquire a real-time video frame;
duplicate the real-time video frame to obtain two real-time video frames;
output one of the two real-time video frames for display, and perform a first stability augmentation processing on the other of the two real-time video frames; and
save the first stability augmentation processed real-time video frame. The circuitry may include an image acquisition module configured to acquire the real-time video frame and/or a processor electrically connected to the image acquisition module.

According to a third aspect of the present disclosure, a movable platform is provided. The movable platform can comprise:
a main body; and
the photographing device of the second aspect of the present disclosure, the photographing device being provided on the main body.

According to a fourth aspect of the present disclosure, a computer-readable storage medium having a computer program stored thereon is provided, and when the computer program is executed by one or more processors, the steps of the control method for a photographing device according to the first aspect of the present disclosure are implemented.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, certain steps of the method may be performed in other orders or at the same time; some components/elements can also be disassembled, combined or partially combined; therefore, the actual arrangement may be changed or modified according to actual conditions. In the case of no conflict, the components, elements, operations/steps, and other features disclosed in the embodiments may be combined with each other.

Since the stored video frames may generally be used for playback, the video frame quality requirements can be high, while the video frames displayed in real time can be instantaneous and have relatively low requirements for video frame quality. In fact, the importance of the stored video frames is usually greater than the importance of the video frames displayed in real time.

Thus, in the present disclosure, to ensure that the stored video frame is a high-quality video, an electronic image stabilization (EIS) algorithm can be used to correct the buffered real-time video frame, and the stored video frame can be the video frame stabilization processed using the EIS algorithm. Meanwhile, in order to avoid the delay of real-time display caused by video frames displayed in real-time by the photographing device being the stabilization processed video frames, one or more embodiments provided in the present disclosure can acquire two sets of real-time video frames by copying the real-time video stream, which are respectively used for outputting for real time display and a first stability augmentation processing, and can save the real-time video frames after the first stability augmentation processing. As such, by separating the real-time video frames used for real-time display from the real-time video frames used for storage, the delay of real-time display can be reduced, and the purpose of real-time display of real-time video frames and storage of high-quality real-time video frames can be achieved. Thus, in one or more embodiments of the present disclosure the technical schemes can obtain two sets of real-time video frames by copying a real-time video stream, which can be respectively used for output for real-time display and the first stability augmentation processing, and save the real-time video frames that are processed by the first stability augmentation processing. By separating the real-time video frames used for real-time display and the real-time video frames used for storage, the delay of real-time display can be reduced, and the purpose of real-time video frame display and high-quality real-time video frame storage can be achieved.

Figure 1:
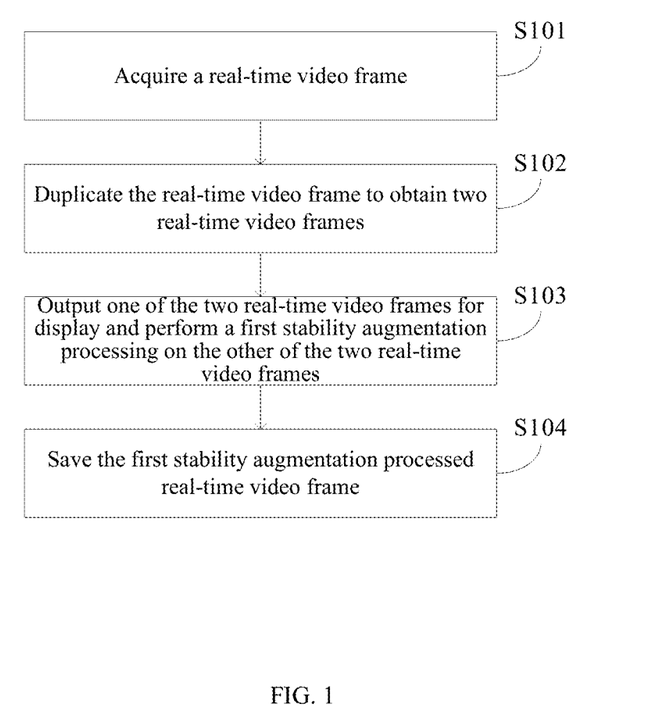
FIG. 1 illustrates a schematic flowchart of a control method for a photographing device according to one or more embodiments of the present disclosure.

FIG. 1 illustrates a schematic flowchart of a control method for a photographing device according to one or more embodiments of the present disclosure. The control method for the photographing device may be applied to a photographing device, for example, a sports camera, a camera, a handheld gimbal, a mobile phone, a digital video (DV) camera/camcorder, or other photographing devices. The control method for the photographing device may include steps S101 to S104.

Step S101 may include acquiring a real-time video frame.

In some embodiments, the photographing device may include an image acquisition module, and the image acquisition module can be used to acquire an original image. The real-time video frame can be the original image acquired by the image acquisition module in real time. In certain embodiments, the image acquisition module may be a CCD image sensor, a camera, etc.

In some embodiments, in the process of collecting real-time video frames of each frame, the image acquisition module can also acquire the time stamp of each real-time video frame. For example, the time stamp may be the exposure time of each real-time video frame or may be generated using a preset algorithm based upon the exposure time, which is not limited in the disclosure. In the subsequent embodiments, the time stamp is described by taking the exposure time as an example.

Step S102 may include duplicating the real-time video frame obtain two real-time video frames.

In some embodiments, a processor in the photographing device may communicate with the image acquisition module, so that the processor may acquire the real-time video frame from the image acquisition module, and then the processor can copy the acquired real-time video frame to obtain two real-time video frames.

Step S103 may include outputting one of the two real-time video frames for display, and performing a first stability augmentation processing on the other of the two real-time video frames.

In some embodiments, the processor in the photographing device can output one of the two real-time video frames for display, and can perform the first stability augmentation processing on the other of the two real-time video frames.

In the following embodiments, two real-time video frames obtained in step S102 may be referred to as a first real-time video frame and a second real-time video frame, respectively. Thus, the first real-time video frame and the second real-time video frame can be copies of the real-time video frame acquired in step S101. The processor may output the first real-time video frame for display and may perform the first stability augmentation processing on the second real-time video frame.

Different strategies may be adopted to display the output first real-time video frame in real time. For example, in some embodiments, the photographing device may not have a display module, and the processor may communicate with an external display module. The first real-time video frame may be transmitted to the external display module by the processor, and the first real-time video frame can be displayed in real time through the external display module. In other embodiments, the photographing device may include a display module, and the processor may transmit the first real-time video frame to the display module to display the first real-time video frame on the display module.

Figure 2:
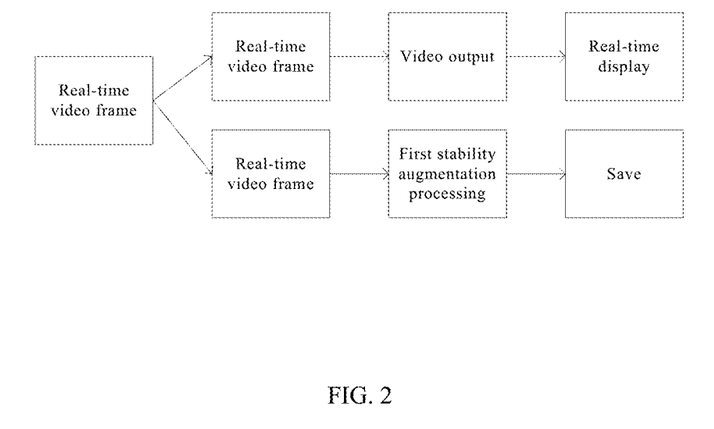
FIG. 2 illustrates a schematic flowchart of a control method for a photographing device according to one or more embodiments of the present disclosure.
Figure 3:
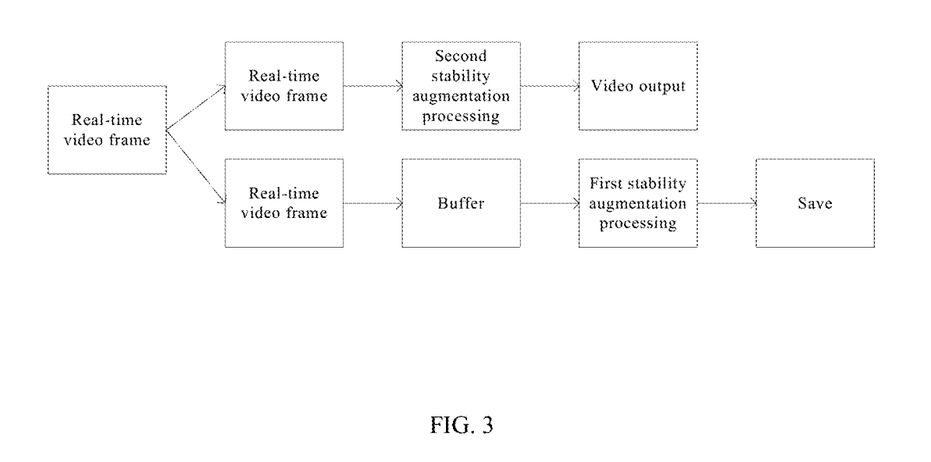
FIG. 3 illustrates a schematic flowchart of a control method for a photographing device according to one or more embodiments of the present disclosure.

In some embodiments, the output first real-time video frame can be one of the unprocessed one of the two real-time video frames. After acquiring the first real-time video frame, the processor can directly output the first real-time video frame (as shown in FIG. 2), so that real-time video frames can be presented to users in a timely manner. In other embodiments, the output first real-time video frame can be the real-time video frame after a second stability augmentation processing is performed on the first real-time video frame obtained in step S102. That is, the implementation process of outputting the first real-time video frame for display may include: performing a second stability augmentation processing on the first real-time video frame obtained in step S102, and then outputting the second stability augmentation processed real-time video frame for display (as shown in FIG. 3). The acquisition time of the attitude data of the photographing device used in the first stability augmentation processing can be at least partly later than the acquisition time of the attitude data of the photographing device used in the second stability augmentation process. As such, for the same video frame, the delay caused by the first stability augmentation processing can be greater than the delay caused by the second stability augmentation processing, which can ensure that the real-time video frame is presented to users in a timely and high-quality manner.

In some embodiments, the implementation process of performing the second stability augmentation processing on the first real-time video frame may include, but is not limited to, steps A1-A4:

In step A1, an exposure time of the real-time video frame can be acquired.

In one or more embodiments of the present disclosure, the sampling frequency of a spatial attitude sensor of the photographing device can be greater than the sampling frequency of the image acquisition module. Therefore, during the period of time when the real-time video frame is collected by the image acquisition module, an actual attitude of the photographing device that the spatial attitude sensor may collect can include a plurality, and the plurality of actual attitudes can correspond to the row region in the real-time video frame.

In step A2, first attitude data of the photographing device before the exposure time can be acquired.

The process may further include acquiring attitude data of the photographing device, where the attitude data may include the first attitude data. And the attitude data may further include a time stamp and a second attitude data matching a time stamp of the real-time video frame.

In certain embodiments, the spatial attitude sensor in the photographing device may periodically collect attitude data of the photographing device at different moments, and the attitude data may be buffered. The spatial attitude sensor may include, for example, a three-axis gyroscope, a three-axis accelerometer, a three-axis electronic floppy disk accelerometer, a GPS, etc.

Selections according to specific scenarios may be made, which are not limited herein.

The period of acquiring attitude data by the space attitude sensor may be associated with the period of acquiring real-time image frames by the image acquisition module, for example, 300 attitude data and 30 real-time video frames can be collected within 1 second; of course, the period of acquiring attitude data by the space attitude sensor may also be independent of the period of acquiring real-time image frames by the image acquisition module. Such values may be adjusted according to specific scenarios, which are not limited herein.

When the spatial attitude sensor collects attitude data, the spatial attitude sensor can also generate a time stamp of the attitude data, such as an acquisition time, a marker generated by a preset algorithm based on the acquisition time, etc., which is not limited in the present disclosure.

The attitude data may include an attitude data matching the time stamp of each real-time video frame. Time stamp matching can mean that time stamps are the same or the difference between time stamps is less than a set threshold. The set threshold may be set according to specific scenarios, such as 0.01 seconds, which is not limited herein.

Thus, in one or more embodiments of the present disclosure, the processor may acquire the exposure time in step A1 and acquire the first attitude data before the exposure time based upon the exposure time. The number of the first attitude data may be one or more.

In some embodiments, the processor may merge the second attitude data into the first attitude data, and may take the second attitude data as the last attitude data. Of course, when the number of the first attitude data is relatively large, the first attitude data may not adopt the second attitude data. Such processing or data may be adjusted according to specific scenarios, which is not limited herein.

In step A3, based upon the first attitude data, a first target attitude corresponding to the exposure time of the photographing device can be determined.

In some embodiments, the determining the first target attitude corresponding to the exposure time of the photographing device based upon the first attitude data may include subjecting the first attitude data to a first low-pass filtering processing to obtain a first low-frequency signal that does not exceed a first cutoff frequency in the first attitude data, and based upon the first low-frequency signal, the first target attitude can be generated.

The first attitude data may be input into a preset first low-pass filter, and the first low-pass filter can perform the first low-pass filtering processing on the first attitude data. The first low-pass filter may filter out high-frequency signals greater than the first cut-off frequency in the first attitude data, and obtain the first low-frequency signal that does not exceed the first cut-off frequency in the first attitude data. It is understandable that if the first low-pass filter has the function of frequency domain transformation, the first attitude data may be directly input to the first low-pass filter; if the first low-pass filter does not have the function of frequency domain transformation, it can be necessary to perform frequency domain transformation on the first attitude data, and then input the first attitude data after the frequency domain transformation into the first low-pass filter. The method of frequency domain transformation may refer to relevant technologies, which is not limited herein.

The first low-pass filter may include at least one of the following: a finite impulse response (FIR) filter and an infinite impulse response (UR) filter. A suitable low-pass filter may be selected as the first low-pass filter, however, according to a specific scenario. In the case that frequency-domain low-pass filtering can be achieved, the corresponding filter can fall within the protection scope of the present disclosure.

It is understandable that the lower the first cut-off frequency is, the stronger the ability to filter out high-frequency signals in the attitude data is, and the smoother the obtained first target attitude is, that is, the slower the motion of the photographing device is, the lower the impact on the subsequent display of video images is. In certain embodiments, the first cutoff frequency can be positively correlated with the shaking amplitude of the photographing device, that is, the smaller the shaking amplitude of the photographing device is, the smaller the first cutoff frequency can be set.

Figure 4:
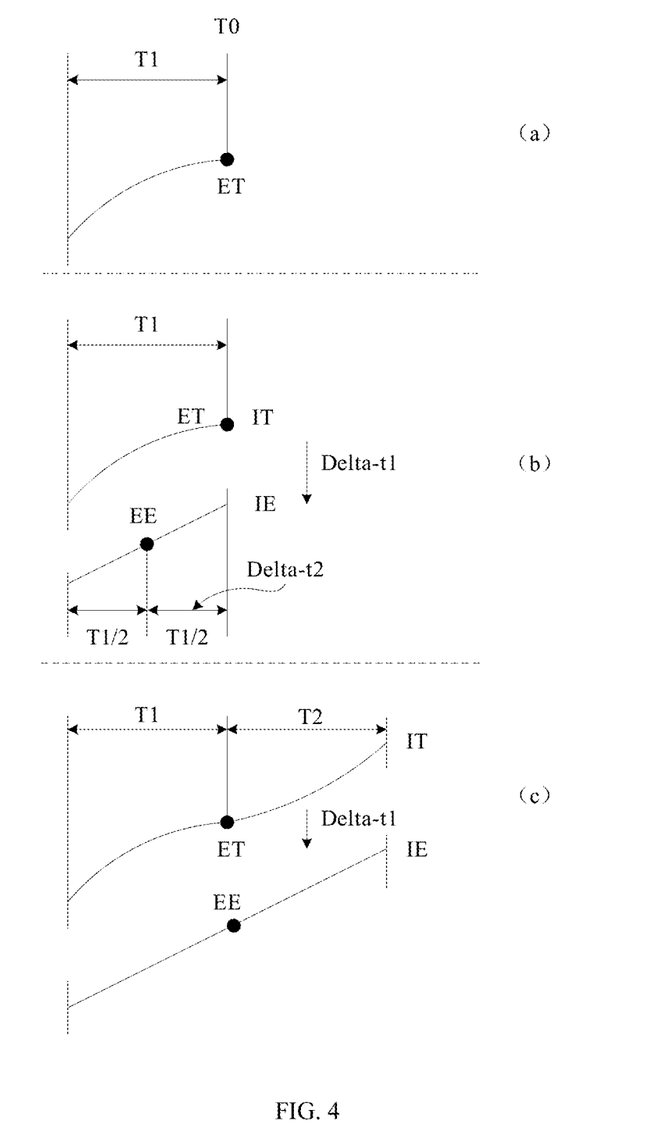
FIG. 4 illustrates a schematic diagram of an actual attitude and a target attitude according to one or more embodiments of the present disclosure.

Taking the monotonic motion of the photographing device as an example, the monotonic motion can refer to the movement of the photographing device in one direction, including uniform speed, acceleration, deceleration, and the like. Further taking uniform motion as an example, FIG. 4, for instance, illustrates a schematic diagram of an actual attitude and a target attitude according to one or more embodiments of the present disclosure. As shown in FIG. 4, an actual attitude of the photographic device is shown in panel (a) of FIG. 4, where the panel (a) of FIG. 4 shows an actual exposure point ET, an exposure time T0, and attitude data including first attitude data in a first time period T1 before the exposure time T0.

Referring to the panel (b) of FIG. 4, the processor can collect the first attitude data, where the time used for collection, storage, and preprocessing can be Delta-t1. The first attitude data can correspond to an actual attitude IT. Based on the first attitude data, a first target attitude 1E may be obtained. When the first low-pass filter processor is used as a median filter, the median point EE of the first attitude data can be located at T½. Subsequently, the data at the median point EE can be used for stability augmentation of the first real-time video frame at the actual exposure point ET.

In addition, for multiple (e.g., several) frames of the first real-time video frame at early acquisition time, such as the continuously acquired real-time video frame 1, real-time video frame 2, real-time video frame 3, real-time video frame 4, and real-time video frame 5, real-time video frame 1 can be the real-time video frame collected by the image acquisition module for the first time. The durations from the exposure time of real-time video frame 1 to the exposure times of the above-mentioned real-time video frame 2, real-time video frame 3, real-time video frame 4, and real-time video frame 5 can all be shorter than the duration corresponding to the first time period T1. For real-time video frame 1, the processor may not perform the second stability augmentation processing, but can directly output it for display; for real-time video frame 2, the first attitude data corresponding to real-time video frame 1 may be used to perform the second stability augmentation processing on the attitude data of real-time video frame 2; for real-time video frame 3, the first attitude data corresponding to real-time video frame 1 and real-time video frame 2 may be used to perform the second stability augmentation processing on the attitude data of real-time video frame 3; for real-time video frame 4 and real-time video frame 5, and so on. For the first real-time video frame whose duration from the exposure time to the exposure time of the first-collected real-time video frame is greater than or equal to the duration corresponding to the first time period T1, the first attitude data in the first time period T1 before the exposure time of the first real-time video frame can be used to perform the second stability augmentation processing on the attitude data of the first real-time video frame.

Figure 5:
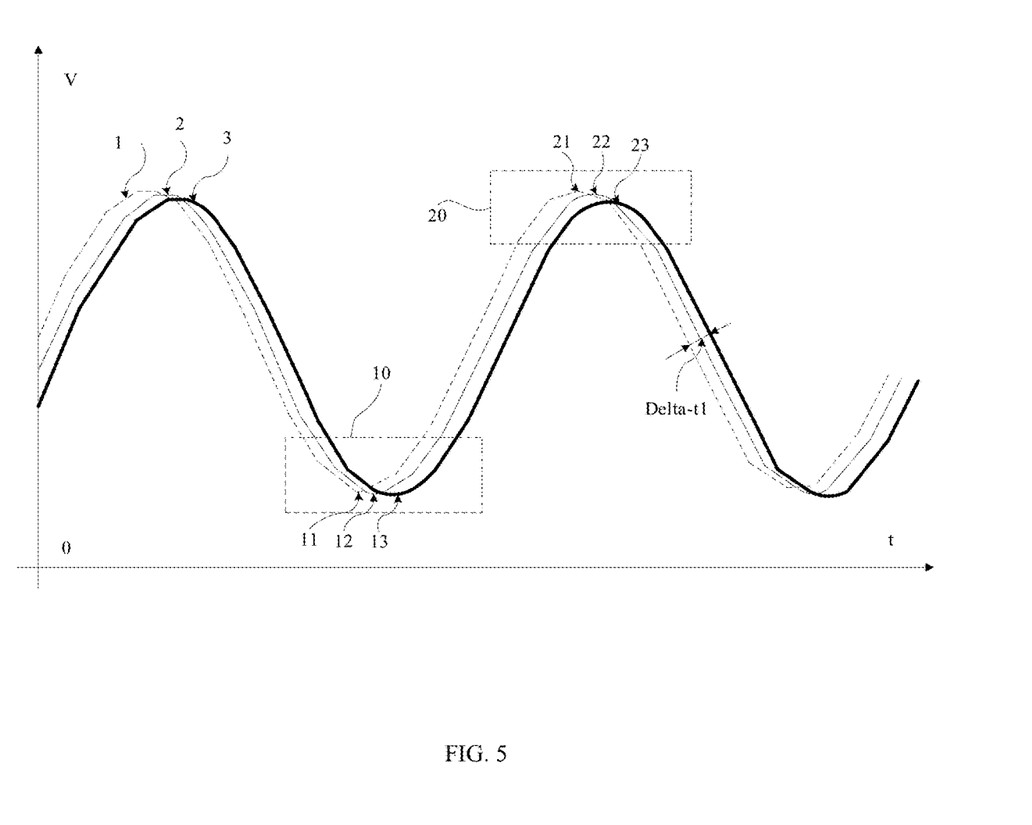
FIG. 5 illustrates a schematic diagram of a target attitude according to one or more embodiments of the present disclosure.

FIG. 5 illustrates a schematic diagram of an actual attitude and a target attitude according to one or more embodiments of the present disclosure. As shown in FIG. 5, the curve indicated by number 1 can be representative of an actual attitude of the photographing device, and the curve indicated by number 2 can be representative of a first target attitude of the photographing device. Taking two rectangular areas 10 and 20 as an example, there can be a jitter part 11 in the actual attitude 1 in the rectangular area 10. After a second low-pass filter, the area 12 corresponding to the jitter part 11 in the first target attitude 2 has been smoothed, the results corresponding to the numbers 21 and 22 in the rectangular area 20 may be considered similar and will not be described herein.

Understandably, to ensure the efficiency of stability augmentation, in some embodiments, the delay between the median point EE and the actual exposure point ET may not exceed a preset first delay threshold, that is, the delay between the zero frequency of the first target attitude and the zero frequency of the actual attitude of the photographing device may not exceed the preset first delay threshold. The value range of the first delay threshold can be greater than or equal to 0 seconds and less than or equal to 0.5 seconds. In some embodiments, the first delay threshold may be 0.1 seconds or 0.5 seconds.

In step A4, based upon the first target attitude, the first real-time video frame can be subjected to a second stability augmentation processing to obtain the second stability augmentation processed real-time video frame.

When the first real-time video frames is stability-augmented based upon the first target attitude to obtain the second stability augmentation processed real-time video frame, that is, specifically, a pixel area of the second stability augmentation processed real-time video frame in the first real-time video frame is determined based upon the first target attitude; then, the first real-time video frame can be cropped based upon the pixel area to obtain the second stability augmentation processed real-time video frame.

Using the first target attitude as a reference, the process of determining the pixel area of the second stability augmentation processed real-time video in the first real-time video frame may include: using the first target attitude as the reference, determining a first position of a preset pixel point of the second stability augmentation processed real-time video in the first real-time video frame; based upon the first position, determining a second position of a pixel point other than the preset pixel point in the second stability augmentation processed real-time video frame in the first real-time video frame; and based upon the first position and the second position, determining the pixel area of the second stability augmentation processed real-time video frame in the first real-time video frame.

When determining the first position of the preset pixel point of the second stability augmentation processed real-time video frame in the first real-time video frame based upon the first target attitude, that is, firstly, the first real-time video frame may be divided into a plurality of first image blocks according to a first preset manner; using the first target attitude as the reference, the first position of the preset pixel point in each first image block in the first real-time video frame can be determined by back projection. The first preset manner may include at least one of the following: grid segmentation and uniform segmentation. For example, when the first real-time video frame is segmented by a grid, the obtained first image block may be a square block, and the preset pixel point may include four vertices of the first image block. In some embodiments, due to the sampling frequency of the spatial attitude sensor, the distortion of the real-time video frame, the internal parameters of the photographing device, and other factors, the actual attitude of the photographing device corresponding to each preset pixel point may be different. Therefore, when the first position of the preset pixel points in each first image block in the first real-time video frame is determined by back-projection using the first target attitude as the reference, the attitude deviation of each preset pixel point can be determined based upon the first target attitude and the actual attitude of the photographing device corresponding to each preset pixel point, then, based upon the attitude deviation of each preset pixel point, the first position of each preset pixel point in the first real-time video frame can be determined by back projection.

When determining the second position of the pixel point other than the preset pixel point in the second stability augmentation processed real-time video frame in the first real-time video frame based upon the first position, that is, for the pixel point other than the preset pixel point, based upon the first positions of a plurality of preset pixel points around the pixel point, the second position of the pixel point in the first real-time video frame can be determined by using an interpolation algorithm. The interpolation algorithm may be a linear interpolation algorithm or other interpolation algorithms.

In the embodiments of the present disclosure, the first positions of some pixel points in the first image block in the first real-time video frame can be determined by back projection, and then the second positions of the pixel points in the first image block other than the preset pixel points in the first real-time video frame can be determined by the interpolation algorithm, which may reduce the amount of calculation of the photographing device.

Understandably, the size of the second stability augmentation processed real-time video frame can be smaller than the size of the first real-time video frame obtained in step S102. In other words, the real-time video frame after the second stability augmentation processing can be a part of the image cropped from the first real-time video frame obtained from step S102.

It should be noted that in the process of processing the first real-time video frame, the first target attitude may be close to the edge of the first real-time video frame obtained in step S102. In this case, the first target attitude may need to be translated appropriately to ensure the real-time video frame after the second stability augmentation processing does not include the edge area of or the blank area outside the first real-time video frame obtained in step S102.

In some embodiments, the processor may directly perform stability augmentation processing on the first real-time video frame based upon the first target attitude corresponding to the exposure time of each first real-time video frame.

In some embodiments, the processor may obtain the second stability augmentation processed real-time video frame of the previous frame. If the real-time video frame after the second stability augmentation processing does not exceed the boundary of the first real-time video frame, the processor may directly perform stability augmentation processing on each first real-time video frame; if the boundary of the real-time video frame after the second stability augmentation processing is coincident with the boundary of the first real-time video frame, the processor may perform stability augmentation processing on each first real-time video frame while maintaining that the boundary of the real-time video frame after the second stability augmentation processing does not exceed the boundary of the first real-time video frame.

It is understandable that the present disclosure only illustratively introduces the above one or more embodiments of stabilizing the first real-time video frame. A suitable method for stabilizing the first real-time video frame according to specific scenarios may be chosen.

Please referring to FIG. 3, which illustrates a schematic flowchart of a control method for a photographing device according to one or more embodiments of the present disclosure, before performing the first stability augmentation processing on the second real-time video frame, the control method may further include: buffering the second the real-time video frame. In some embodiments, a first-in-first-out memory (FIFO) may be provided in the photographing device, and the processor may store the second real-time video frame obtained through step S102 in the FIFO. Specifically, the second real-time video frame obtained in step S102 may be stored in a first-in-first-out memory capable of storing images of a preset number of frames.

It can be understood that the faster the frequency corresponding to buffering the second real-time video frame is, the more frames of the second real-time video frame the first stability augmentation processing may perform stabilization processing based upon, the higher-quality real-time video frames may be obtained. However, the faster the motion state of the photographing device changes, the greater the impact on the subsequent display of video images may be, therefore, a more effective stabilization method may be adopted to enhance the stability of real-time video frames. It should be understood that the saved real-time video frames that can be subjected to the first stability augmentation processing may generally be used for playback, and the stabilization effect may need to be relatively good, but the video displayed in real time can be instantaneous, and the requirement for the stabilization effect may be relatively low to ensure that real-time video frame is displayed in time. In some embodiments, the frequency corresponding to buffering the second real-time video frame can be positively correlated with the shaking frequency of the photographing device, that is, the greater the shaking frequency of the photographing device is, the larger the frequency corresponding to buffering the second real-time video frame can be.

The implementation process of performing the first stability augmentation processing on the second real-time video frames may include, but is not limited to, steps B1-B4.

In step B1, an exposure time of the real-time video frame can be acquired.

In step B2, third attitude data of the photographing device before the exposure time and fourth attitude data of the photographing device after the exposure time can be acquired.

In some embodiments, the control method may further include acquiring attitude data of the photographing device, the attitude data including third attitude data and fourth attitude data. And the attitude data may further include a time stamp and fifth attitude data may match the time stamp of the real-time video frame (equivalent to the above-mentioned second attitude data).

The manner of acquiring the attitude data of the photographing device can be similar to the manner of acquiring the attitude data of the photographing device in the foregoing embodiments and will not be repeated herein for conciseness.

In some embodiments, the processor may acquire the exposure time in step B1 and acquire the third attitude data (equivalent to the aforementioned first attitude data) before the exposure time and the fourth attitude data after the exposure time based upon the exposure time. The number of the third attitude data may be one or more, and the number of the fourth attitude data may be one or more. Compared with using only the attitude before the exposure time (i.e., the above-mentioned first attitude data) in the second stability augmentation processing, adding the fourth attitude data based on the third attitude data may increase the time span of the attitude data and ensure that the low-frequency motion of the photographing device after the exposure time will not affect the target attitude.

In some embodiments, the processor may merge the fifth attitude data into the third attitude data and the fourth attitude data. In the third attitude data, the fifth attitude data may be used as a last attitude data. In the fourth attitude data, the fifth attitude data may be used as a first attitude data. Of course, when the number of the third attitude data and the fourth attitude data is relatively large, the fifth attitude data may not be used. Adjustments may be made according to specific scenarios.

In some embodiments, the third attitude data may correspond to a first time period, and the fourth attitude data may correspond to a second time period. The first time period corresponding to the third attitude data can refer to the time difference between the time stamps corresponding to the first-collected attitude data and the last-collected attitude data in the third attitude data. The second time period corresponding to the fourth attitude data can refer to the time difference between the time stamps between the first-collected attitude data and the last-collected attitude data in the fourth attitude data. It should be noted that if the third attitude data or the fourth attitude data only includes one attitude data, the first time period or the second time period may correspond to a time. In this case, the time may be replaced with a smaller preset value, such as 0.01 seconds.

In some embodiments, the value range of the first time period and the second time period may include 0.5 seconds to 1.0 seconds. Considering the type of low-pass filter and its operating efficiency, the first time period corresponding to the third attitude data and the second time period corresponding to the fourth attitude data may be the same, for example, both may be 0.5 seconds. In this case, a symmetrical frequency domain low-pass filter may be used to increase the filtering speed.

In other embodiments, the first time period corresponding to the third attitude data and the second time period corresponding to the fourth attitude data may be different, and a symmetrical frequency domain low-pass filter may be used to improve the filtering accuracy.

In some embodiments, considering that the second real-time video frame of each frame can correspond to a group of attitude data (that is, the third attitude data and the fourth attitude data), while buffering the second real-time video frame of each frame, the storage address of the attitude data may be used as the characteristic data of the second real-time video frame of the frame. As such, when reading the second real-time video frame of each frame, the processor may read the attitude data from the corresponding storage address, which can improve the reading efficiency.

In some embodiments, for the second real-time video frame to be stability-augmented in two adjacent frames, sixth attitude data of the second real-time video frame to be stability-augmented in the previous frame can partially overlap with seventh attitude data of the second real-time video frame to be stability-augmented in the next frame, so as to ensure that the subsequent target attitude obtained can be smoother. Or, for the second real-time video frame to be stability-augmented in two adjacent frames, the sixth attitude data of the second real-time video frame to be stability-augmented in the previous frame and the seventh attitude data of the second real-time video frame to be stability-augmented in the next frame does not overlap, which can reduce the amount of data calculation.

In step B3, based upon the third attitude data and the fourth attitude data, a second target attitude corresponding to the photographing device at the exposure time can be determined.

In some embodiments, the determining the second target attitude corresponding to the photographing device at the exposure time based upon the third attitude data and the fourth attitude data may include: subjecting the third attitude data and the fourth attitude data to a second low-pass filtering processing to obtain a second low-frequency signal that does not exceed a second cut-off frequency in the third attitude data and the fourth attitude data; and based upon the second low-frequency signal, generating the second target attitude.

The third attitude data and the fourth attitude data may be input into a preset second low-pass filter, and the second low-pass filter can perform the second low-pass filtering processing on the third attitude data and the fourth attitude data. The second low-pass filter may filter out high-frequency signals greater than the second cut-off frequency in the third attitude data and the fourth attitude data, and obtain the second low-frequency signal that does not exceed the second cut-off frequency in the third attitude data and the fourth attitude data. It can be understood that if the second low-pass filter has the function of frequency domain transformation, the third attitude data and the fourth attitude data may be directly input into the second low-pass filter; if the second low-pass filter does not have the function of frequency domain transformation, frequency domain transformation on the third attitude data and fourth attitude data is required, and then the third attitude data and fourth attitude data after the frequency domain transformation can be input into the second low-pass filter. The method of frequency domain transformation may refer to relevant technologies, which is not limited herein.

The second low-pass filter may include at least one of the following: an FIR filter and an HR filter. A suitable second low-pass filter may be selected according to a specific scenario.

The second cut-off frequency may be greater than or equal to 0.5 Hz and less than or equal to 10 Hz. In some embodiments, the cut-off frequency of the frequency domain low-pass filter may be 0.5 Hz. It is understandable that the lower the second cut-off frequency is, the stronger the ability to filter out high-frequency signals in the attitude data can be, and the smoother the obtained second target attitude can be, that is, the slower the motion state of the photographing device is, and the lower the impact on the subsequent display of video images can be.

Referring back to the embodiments shown in FIG. 4, panel (b) of FIG. 4 illustrates one or more embodiments of the second stability augmentation processing, as shown in panel (b) of FIG. 4, since the data at the median point EE can be subsequently used for the stabilization of the first real-time video frame at the actual exposure point ET, there can be a delay Delta-t2 between the median point EE and the actual exposure point ET, where Delta-t2 can be equal to T½. The delay can be due to the processing result obtained by the first low-pass filter, i.e., the deviation between the median point EE and the actual exposure point ET, or it can be understood as a filtering error. If the photographing device shakes during the delay Delta-t2, there can be deviation when the data at the median point EE is used to stabilize the first real-time video frame.

Referring to panel (c) of FIG. 4, the processor can acquire the third attitude data and the fourth attitude data, where the time for the acquisition, storage, and preprocessing of the third attitude data and the fourth attitude data can be Delta-t. The third attitude data and the fourth attitude data can correspond to one actual attitude IT. Taking that T1 and T2 can be equal as an example, the processor may obtain the second target attitude IE based upon the third attitude data and the fourth attitude data. In the case of using the second low-pass filter as a median filter, the median point EE of the third attitude data and the fourth attitude data can be located at T0, which can coincide with the actual exposure point ET, which can avoid the delay Delta-t2 of T½ shown in the panel (b), i.e., the delay Delta-t2 can be equal to 0. As such, when the second real-time video frame at ET is subsequently stabilized by using the data at the median point EE, the photographing device may not shake, so the result of stabilizing the second real-time video frame by using the data at the median point EE can be more accurate. The delay between the zero frequency of the second target attitude and the zero frequency of the actual attitude of the photographing device may not exceed a preset delay threshold.

In addition, for first few frames of the second real-time video frame at early acquisition time, such as the continuously acquired real-time video frame 1, real-time video frame 2, real-time video frame 3, real-time video frame 4, and real-time video frame 5, real-time video frame 1 can be the first frame of the real-time video frame collected by the image acquisition module. The durations from the exposure time of real-time video frame 1 to the exposure times of real-time video frame 2, real-time video frame 3, real-time video frame 4, and real-time video frame 5 can all be less than the duration corresponding to the first time period T1. For real-time video frame 1, the processor may only use the fourth attitude data in the second time period T2 after the exposure time of real-time video frame 1 to perform the first stability augmentation processing on the attitude data of real-time video frame 1; for real-time video frame 2, the third attitude data corresponding to real-time video frame 1 and the fourth attitude data in the second time period T2 after the exposure time of real-time video frame 2 may be used to perform the first stability augmentation processing on the attitude data of real-time video frame 2; for real-time video frame 3, the third attitude data corresponding to real-time video frame 1 and real-time video frame 2 and the fourth attitude data in the second time period T2 after the exposure time of real-time video frame 3 may be used to perform the first stability augmentation processing on the attitude data of real-time video frame 3; for real-time video frame 4 and real-time video frame 5, and so on. For the second real-time video frame whose duration from the exposure time to the exposure time of the first-collected real-time video frame is greater than or equal to the duration corresponding to the first time period T1, the third attitude data in the first time period T1 before the exposure time of the second real-time video frame of the frame and the fourth attitude data in the second time period T2 after the exposure time of the second real-time video frame of the frame can be used to perform the first stability augmentation processing on the attitude data of the second real-time video frame of the frame.

The length of the first time period corresponding to the third attitude data and the length of the second time period corresponding to the fourth attitude data may be equal or may be unequal. It should be noted that when the first time period and the second time period are the same in time length, the positions of the median point EE and the actual exposure point can be coincident or close, that is, the actual attitude of the photographing device and the second target attitude can be coincident. Considering that the processor may need to delay Delta-t1 to acquire and store the attitude data, the fluctuation between the actual attitude and the second target attitude may be as shown in FIG. 5. FIG. 5 illustrates a schematic diagram of an actual attitude and a second target attitude according to one or more embodiments of the present disclosure. As shown in FIG. 5, the curve indicated by number 1 can represent an actual attitude of the photographing device, and the curve indicated by number 3 can be a second target attitude of the photographing device. Taking two rectangular areas 10 and 20 as an example, there can be a jitter part 11 in the actual attitude 1 in the rectangular area 10. After the second low-pass filtering, the area 13 corresponding to the jitter part 11 in the second target attitude 3 may have been smoothed, and the smoothing effect of region 13 may be better than that of region 12, that is, the stabilization effect of the first stability augmentation processing may be better than that of the second stability augmentation processing. The results corresponding to regions 21 and 23 in the rectangular region 20 can be similar and will not described herein.

In some embodiments, when the first time period and the second time period are different, as the gap between the two becomes larger and larger, and the delay between the position of the median point EE and the actual exposure point can become larger and larger. It can be understood that due to the addition of the fourth attitude data in the second time period, the delay between the median point EE and the actual exposure point can still be less than the delay between the median point EE and the actual exposure point ET shown in the panel (b) of FIG. 4, that is, IE in panel (c) can be smoother than IE in panel (b).

In order to ensure the efficiency of the first stability augmentation processing, in one or more embodiments, the delay between the median point EE and the actual exposure point ET may not exceed a preset second delay threshold, that is, the delay between the zero frequency of the target attitude and the zero frequency of the actual attitude of the photographing device may not exceed the preset second delay threshold. The value range of the second delay threshold can be greater than or equal to 0 seconds and less than or equal to 0.5 seconds. In certain embodiments, the delay threshold may be 0.1 seconds or 0.5 seconds.

In some embodiments, before acquiring the second real-time video frame of a frame, the processor may first acquire a preset number of real-time video frames collected by the image acquisition module, which may ensure sufficient delay to facilitate filtering by the second low-pass filter. The preset number may be set in advance, such as acquiring real-time video frames within 1 second, if the acquisition frequency of the image acquisition module is 30 fps, the preset number can be 30 frames; if the acquisition frequency of the image acquisition module is 60 fps, then the preset number can be 60 frames. In addition, the preset number may also be associated with the second low-pass filter preset in the photographing device. For example, if the second low-pass filter takes a short time to filter the actual attitude of the photographic device, the present number may be appropriately increased; if the second low-pass filter takes a long time to filter the actual attitude of the photographing device, the preset number may be appropriately reduced. That is, the preset number in the one or more embodiments of the present disclosure may be adjusted according to specific scenarios. In the case that buffering the second real-time video frame can be realized, the corresponding scheme falls within the protection scope of the present disclosure.

In step B4, based upon the second target attitude, the buffered second real-time video frame can be subjected to a first stability augmentation processing to obtain the first stability augmentation processed real-time video frame.

In some embodiments, when the second real-time video frame is subjected to the first stability augmentation processing, the attitude data of the photographing device before and after the exposure time may be used, that is, the attitude data of the photographing device when photographing several real-time video frames after the second real-time video frame can be used. Therefore, after the second real-time video frame is collected, the second real-time video frame may not be subjected to the first stability augmentation processing immediately, but the second real-time video frame may be buffered. After next few video frames of the second real-time video frame are collected, the second real-time video frame can be obtained from the buffer, and then subjected to the first stability augmentation processing.

It should be noted that, in some embodiments, when the first real-time video frame is output without processing, the second stability augmentation processing may be the first stability augmentation processing. In this case, the second real-time video frame may also not be buffered, as shown in FIG. 2, which illustrates a schematic flowchart of a control method for a photographing device according to one or more embodiments of the present disclosure.

When the first stability augmentation processed real-time video frame is obtained by stabilizing buffered the second real-time video frame based upon the second target attitude, that is, specifically, using the second target attitude as a reference, a pixel area of the first stability augmentation processed real-time video frame in the second real-time video frame can be determined; based upon the pixel area, the second real-time video frame can be cropped to obtain the first stability augmentation processed real-time video frame.

Using the second target attitude as the reference, the process of determining the pixel area of the first stability augmentation processed real-time video frame in the second real-time video frame may include: using the second target attitude as the reference, determining a third position of a preset pixel point of the first stability augmentation processed real-time video frame in the second real-time video frame; based upon the third position; determining a forth position of a pixel point other than the preset pixel point in the first stability augmentation processed real-time video frame in the second real-time video frame; and based upon the third position and the fourth position, determining the pixel area of the first stability augmentation processed real-time video frame in the second real-time video frame.

When the third position of the preset pixel point of the first stability augmentation processed real-time video frame in the second real-time video frame is determining by using the second target attitude as the reference, firstly, the second real-time video frame may be divided into a plurality of second image blocks according to a second preset manner, and then, using the second target attitude as the reference, the third position of the preset pixel point in each second image block in the second real-time video frame can be determined by back projection. The second preset manner may include at least one of the following: grid segmentation and uniform segmentation. For example, when the second real-time video frame may be segmented by a grid, the obtained second image block may be a square block, and the preset pixel point may include four vertices of the second image block. In some embodiments, due to the sampling frequency of the spatial attitude sensor, the distortion of the real-time video frame, and the internal parameters of the photographing device and other factors, the actual attitude of the photographing device corresponding to each preset pixel point may be different. Therefore, when back-projection is used to determine the third position of the preset pixel point in each second image block in the second real-time video frame by using the second target attitude as the reference, an attitude deviation of each preset pixel point can be determined based upon the second target attitude and the actual attitude of the photographing device corresponding to each preset pixel point, and then, based upon the attitude deviation of each preset pixel point, the third position of each preset pixel point in the second real-time video frame can be determined by back projection.

When determining the fourth position of the pixel point other than the preset pixel point of the first stability augmentation processed real-time video frame in the second real-time video frame based upon the third position, that is, for the pixel point other than the preset pixel point, based upon the third positions of a plurality of preset pixel points around the pixel point, an interpolation algorithm can be used to determine the fourth position of the pixel point in the second real-time video frame. The interpolation algorithm may be a linear interpolation algorithm or other interpolation algorithms.

In the embodiments of the present disclosure, the third positions of some pixel points in the second image block in the second real-time video frame can be first determined by back projection, and then the fourth position of the pixel point other than the preset pixel points in the second image block in the second real-time video frame can be determined by the interpolation algorithm, which may reduce the amount of calculation of the photographing device. Therefore, it can be understood that the size of the first stability augmentation processed real-time video frame may be smaller than the size of the second real-time video frame obtained in step S102. In other words, the real-time video frame after the first stability augmentation processing can be a part of the image cropped from the second real-time video frame obtained from step S102.

It should be noted that during the processing of the second real-time video frame, the second target attitude may be close to the edge of the second real-time video frame obtained by S102. In this case, the second target attitude may be translated appropriately to ensure that the real-time video frame after stability augmentation processing does not contain an edge area of or a blank area outside the second real-time video frame obtained in step S102.

In certain embodiments, the processor may directly perform stability augmentation processing on the second real-time video frame based upon the second target attitude corresponding to the exposure time of each second real-time video frame.

In certain embodiments, the processor may obtain the first stability augmentation processed real-time video frame of the previous frame. If the real-time video frame after the first stability augmentation processing does not exceed the boundary of the second real-time video frame, the processor may directly perform the first stability augmentation processing on each second real-time video frame; if the boundary of the real-time video frame after the first stability augmentation processing is coincident with the boundary of the second real-time video frame, the processor may perform the first stability augmentation processing on each second real-time video frame while maintaining that the real-time video frame after the first stability augmentation processing does not exceed the boundary of the second real-time video frame.

The present disclosure only illustratively discloses the above examples of stabilizing the second real-time video frame. A suitable method for stabilizing the second real-time video frames may be chosen according to specific scenarios, therefore, its corresponding scheme should fall into the protection scope of the instant disclosure. In addition, it should be understood that when selecting a suitable method for stabilizing the second real-time video frame, the first real-time video frame may not undergo stabilization processing. But, if stabilization processing is performed, the stabilization duration of the first real-time video frame may be less than the stabilization duration of the second real-time video frame, so that the first real-time video frame may be displayed in time, and the delay caused by the second stabilization processing and then outputting of the real-time video frame can be avoided or minimized.

By acquiring the third attitude data before the exposure time and the fourth attitude data after the exposure time, the second target attitude corresponding to the exposure time of the photographing device may be obtained based upon the third attitude data and the fourth attitude. Afterwards, the second real-time image frame may be stability-augmented based upon the second target attitude to obtain the first stability augmentation processed real-time video frame. In this way, the fourth attitude data may be used to determine the motion of the photographing device after the exposure of the second real-time video frame, which can ensure that a smooth second target attitude may be obtained after filtering the actual motion of the photographing device, so as to avoid or minimize fluctuation of the real-time video frames after stabilization processing, which can be conducive to improving the stability of the display and the viewing experience.

Compared with the second stability augmentation processing, the first stability augmentation processing can use the attitude data before and after the real-time video frame exposure to perform the low-frequency filtering processing on the actual attitude of the photographing device, so as to obtain a smoother target attitude. The problem of large deviation between the actual attitude of the photographing device and the target attitude caused by a user rotating the photographing device during the time delay of the low-pass frequency domain filtering processing can be avoided, and the stability augmentation effect of the real-time video frame can be relatively better.

Step S104 may include saving the first stability augmentation processed real-time video frame.

In some embodiments, the first stability augmentation processed real-time video frame may be saved to a solid-state disk (SSD). The SSD may be a part of the photographing device, or may be externally connected to the photographing device. In certain embodiment, the first stability augmentation processed real-time video frame may also be saved to other storage devices.

Figure 6:
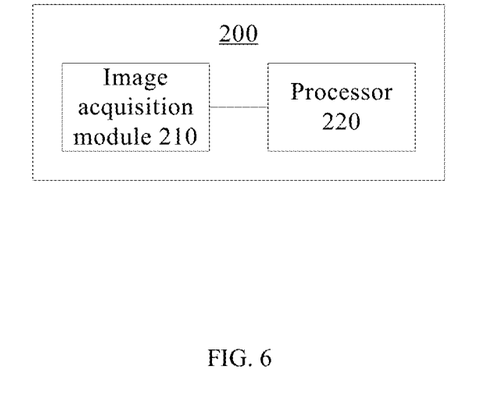
FIG. 6 illustrates a structural block diagram of a photographing device according to one or more embodiments of the present disclosure.

Corresponding to the control method of the photographing device in the foregoing embodiments, the present disclosure can also provide a photographing device. Referring to FIG. 6, which illustrates a structural block diagram of a photographing device according to one or more embodiments of the present disclosure, the photographing device 200 may include an image acquisition module 210 and a processor 220. The image acquisition module 210 can be configured to acquire a real-time video frame, and the image acquisition module 210 can be electrically connected to the processor 220. The image acquisition module 210 may be a CCD image sensor, a camera, or the like.

The processor 220 can be configured to: acquire a real-time video frame; duplicate the real-time video frame to obtain two real-time video frames; output one of the two real-time video frames for display, and perform a first stability augmentation processing on the other of the two real-time video frames; and save the first stability augmentation processed real-time video frame.

For the implementation process and working principle of the processor 220, reference may be made to the description of the control method of the photographing device in the foregoing embodiments, which will not be repeated herein for conciseness.

The processor 220 may be a central processing unit (CPU). The processor 220 may also include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The photographing device 200 may be a camera, a hand-held gimbal (the main body may be a grip), an aerial photographing drone (the main body may be a fuselage), or other devices with photographing functions.

The present disclosure can also provide a movable platform. Please refer to FIG. 7, which illustrates a schematic structural diagram of a movable platform according to one or more embodiments of the present disclosure, the movable platform may include a main body 100 and the photographing device 200 disclosed above, where the photographing device 200 may be mounted on the main body 100. In one or more embodiments, the photographing device 200 may be mounted on the main body 100 through a gimbal 300 to stabilize the photographing device 200 through the gimbal 300, so that the photographing device 200 may obtain a high-quality video or image.

Figure 7:
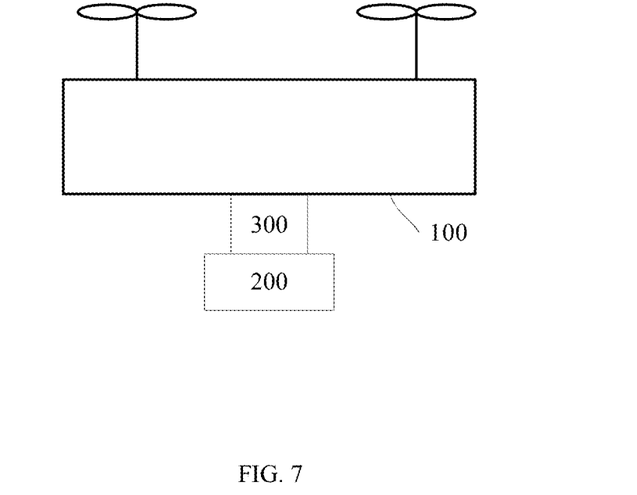
FIG. 7 illustrates a schematic structural diagram of a movable platform according to one or more embodiments of the present disclosure.

The movable platform may be an unmanned aerial vehicle or other mobile devices.

The present disclosure can further provide a computer-readable storage medium, the computer-readable storage medium stores a computer program, which includes program instructions. When the program instructions are executed by a processor (or processors), the steps of the control method of the photographing device provided in the present disclosure can be implemented.

The computer-readable storage medium may be an internal storage unit of the photographing device described in any of the foregoing embodiments, such as a hard disk or a memory of the photographing device. The computer-readable storage medium may also be an external storage device of the photographing device, such as a plug-in hard disk, a smart media card (SMC), and a secure digital (SD) card, a flash card, etc., equipped on the photographing device. Further, the computer-readable storage medium may also include both an internal storage unit and an external storage device of the photographing device. The computer-readable storage medium can be used to store the computer program and other programs and data required by the photographing device and may also be used to temporarily store data that has been output or will be output.

The computer readable storage medium may be a tangible device that can store programs and instructions for use by an instruction execution device (processor or processors). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program, program instructions and/or program codes described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer program/program instructions/program codes for storage in a computer readable storage medium within the computing or processing device.

The computer program, program instructions and/or program codes for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. the computer program/program instructions/program codes may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer program/program instructions/program codes by using information from the computer program/program instructions/program codes to configure or customize the electronic circuitry, in order to perform aspects of the present disclosure.

The computer program, program instructions and/or program codes that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. The computer program/program instructions/program codes may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer program, program instructions and/or program codes may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be one or more single or multi-chip microprocessors, such as those designed and/or manufactured by Intel Corporation, Advanced Micro Devices, Inc. (AMD), Arm Holdings (Ann), Apple Computer, etc. Examples of microprocessors include Celeron, Pentium, Core i3, Core i5 and Core i7 from Intel Corporation: Opteron, Phenom, Athlon, Turion and Ryzen from AMD; and Cortex-A. Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether direct or indirect. Phrases such as "a plurality of," "multiple," or "several" mean two and more.

It should be noted that in the instant disclosure, relational terms such as "first" and "second", etc. are used herein merely to distinguish one entity or operation from another entity or operation without necessarily requiring or implying any such actual relationship or order between such entities or operations. The terms "comprise/comprising," "include/including," "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. A control method for a photographing device, comprising:
   obtaining a real-time video frame;
   duplicating the real-time video frame to obtain a first real-time video frame and a second real-time video frame;
   performing a first stability augmentation processing on the second real-time video frame to obtain first stability augmentation processed second real-time video frame;
   saving the first stability augmentation processed second real-time video frame;
   obtaining an exposure time of the real-time video frame;
   obtaining first attitude data of the photographing device before the exposure time;
   determining a first target attitude corresponding to the photographing device at the exposure time based upon the first attitude data;
   performing a second stability augmentation processing on the first real-time video frame based upon the first target attitude to obtain second stability augmentation processed second real-time video frame, a delay caused by the first stability augmentation processing being greater than a delay caused by the second stability augmentation processing; and
   outputting the second stability augmentation processed first real-time video frame for display.

2. The control method of claim 1, further comprising, before the first stability augmentation processing is performed on the second real-time video frame:
   buffering the second real-time video frame.

3. A photographing device, comprising:
   at least one processor; and
   at least one memory storing at least one computer program that, when executed by the at least one processor, causes the photographing device to:
   obtain a real-time video frame;
   duplicate the real-time video frame to obtain a first real-time video frame and a second real-time video frame;
   perform a first stability augmentation processing on the second real-time video frame to obtain first stability augmentation processed second real-time video frame;
   save the first stability augmentation processed second real-time video frame;
   obtain an exposure time of the real-time video frame;
   obtain first attitude data of the photographing device before the exposure time;
   determine a first target attitude corresponding to the photographing device at the exposure time based upon the first attitude data;
   perform a second stability augmentation processing on the first real-time video frame based upon the first target attitude to obtain second stability augmentation processed second real-time video frame, a delay caused by the first stability augmentation processing being greater than a delay caused by the second stability augmentation processing; and
   output the second stability augmentation processed first real-time video frame for display.

4. The photographing device of claim 3, wherein before the photographing device performs the first stability augmentation processing on the second real-time video frame, the at least one computer program, when executed by the at least one processor, further causes the photographing device to:
   store the second real-time video frame in a first-in-first-out memory capable of storing images of a preset number of frames to buffer the second real-time video frame, wherein the real-time video frame includes a time stamp.

5. The photographing device according to claim 4, wherein to perform the first stability augmentation processing on the second real-time video frame, the at least one computer program, when executed by the at least one processor, further causes the photographing device to:
   obtain third attitude data of the photographing device before the exposure time and fourth attitude data of the photographing device after the exposure time;
   determine a second target attitude corresponding to the photographing device at the exposure time based upon the third attitude data and the fourth attitude data; and
   perform the first stability augmentation processing on the buffered second real-time video frame based upon the second target attitude to obtain the first stability augmentation processed second real-time video frame.

6. The photographing device according to claim 5, wherein the at least one computer program, when executed by the at least one processor, further causes the photographing device to:
   obtain attitude data of the photographing device, wherein the real-time video frame comprises a first time stamp and the attitude data comprises the third attitude data, the fourth attitude data, a second time stamp, and fifth attitude data, at least the second time stamp matching the first time stamp of the real-time video frame.

7. The photographing device according to claim 6, wherein for the second real-time video frame stability augmented processing associated with two adjacent real-time video frames, sixth attitude data of the second real-time video frame to be stability augmented in a previous real-time video frame and seventh attitude data of the second real-time video frame to be stability augmented in a next real-time video frame partially overlap.

8. The photographing device according to claim 5, wherein a first time period corresponding to the third attitude data is equal in time length to a second time period corresponding to the fourth attitude data.

9. The photographing device according to claim 5, wherein to determine the second target attitude corresponding to the photographing device at the exposure time based upon the third attitude data and the fourth attitude data, the at least one computer program, when executed by the at least one processor, further causes the photographing device to:

subject the third attitude data and the fourth attitude data to a second low-pass filtering processing to obtain a second low-frequency signal that does not exceed a second cutoff frequency in the third attitude data and the fourth attitude data; and generate the second target attitude based on the second low-frequency signal.

10. The photographing device according to claim 9, wherein a delay between a zero frequency of the second target attitude and a zero frequency of an actual attitude of the photographing device do not exceed a preset delay threshold.

11. The photographing device according to claim 10, wherein a value range of the preset delay threshold is greater than or equal to 0 seconds and less than or equal to 0.5 seconds.

12. The photographing device according to claim 9, wherein the second cutoff frequency is greater than or equal to 0.5 Hz and less than or equal to 10 Hz.

13. The photographing device according to claim 5, wherein to perform the first stability augmentation processing on the second real-time video frame based upon the second target attitude, the at least one computer program, when executed by the at least one processor, further causes the photographing device to:
determine a pixel area of the first stability augmentation processed second real-time video frame by utilizing the second target attitude as a reference; and
perform a cropping processing on the second real-time video frame based upon the pixel area to obtain the first stability augmentation processed second real-time video frame.

14. The photographing device according to claim 13, wherein to determine a pixel area of the first stability augmentation processed second real-time video frame in the second real-time video frame by utilizing the second target attitude as a reference, the at least one computer program, when executed by the at least one processor, further causes the photographing device to:
determine a third position of a preset pixel point of the first stability augmentation processed second real-time video frame in the second real-time video frame by utilizing the second target attitude as the reference;
determine a fourth position of a pixel point other than the preset pixel point in the first stability augmentation processed second real-time video frame in the second real-time video frame based upon the third position; and
determine the pixel area of the first stability augmentation processed second real-time video frame in the second real-time video frame based upon the third position and the fourth position.

15. The photographing device according to claim 3, wherein the real-time video frame comprises a first time stamp, and the at least one computer program, when executed by the at least one processor, further causes the photographing device to:
obtain attitude data of the photographing device, wherein the attitude data includes the first attitude data, a second time stamp, and second attitude data, at least the second time stamp matching the first time stamp of the real-time video frame.

16. The photographing device according to claim 3, wherein to determine the first target attitude corresponding to the photographing device at the exposure time based upon the first attitude data, the at least one computer program, when executed by the at least one processor, further causes the photographing device to:
subject the first attitude data to a first low-pass filtering processing to obtain a first low-frequency signal that does not exceed a first cutoff frequency in the first attitude data; and
generate the first target attitude based upon the first low-frequency signal.

17. The photographing device according to claim 16, wherein the first cutoff frequency is positively related to a shaking amplitude of the photographing device.

18. The photographing device according to claim 3, wherein to perform the second stability augmentation processing on the first real-time video frame based upon the first target attitude, the at least one computer program, when executed by the at least one processor, further causes the photographing device to:
utilize the first target attitude as a reference, determining a pixel area of the second stability augmentation processed first real-time video frame; and
perform a cropping processing on the first real-time video frame based upon the pixel area to obtain the second stability augmentation processed first real-time video frame.

19. A movable platform, comprising:
a main body; and
a photographing device comprising:
at least one processor; and
at least one memory storing at least one computer program that, when executed by the at least one processor, causes the photographing device to:
obtain a real-time video frame;
duplicate the real-time video frame to obtain a first real-time video frame and a second real-time video frame;
perform a first stability augmentation processing on the second real-time video frame to obtain first stability augmentation processed second real-time video frame;
save the first stability augmentation processed second real-time video frame;
obtain an exposure time of the real-time video frame;
obtain first attitude data of the photographing device before the exposure time;
determine a first target attitude corresponding to the photographing device at the exposure time based upon the first attitude data;
perform a second stability augmentation processing on the first real-time video frame based upon the first target attitude to obtain second stability augmentation processed second real-time video frame, a delay caused by the first stability augmentation processing being greater than a delay caused by the second stability augmentation processing; and
output the second stability augmentation processed first real-time video frame for display.

* * * * *